Dec. 25, 1934.                C. F. WALLACE                1,985,357
                        ELECTRIC MOTOR APPARATUS
                    Filed March 1, 1932      3 Sheets-Sheet 1

INVENTOR
Charles F. Wallace
BY Cooper, Kerr & Dunham
ATTORNEYS

Dec. 25, 1934.     C. F. WALLACE     1,985,357
ELECTRIC MOTOR APPARATUS
Filed March 1, 1932     3 Sheets-Sheet 2

INVENTOR
Charles F. Wallace
BY
Cooper, Kerr & Dunham
ATTORNEYS

Dec. 25, 1934.  C. F. WALLACE  1,985,357
ELECTRIC MOTOR APPARATUS
Filed March 1, 1932   3 Sheets-Sheet 3
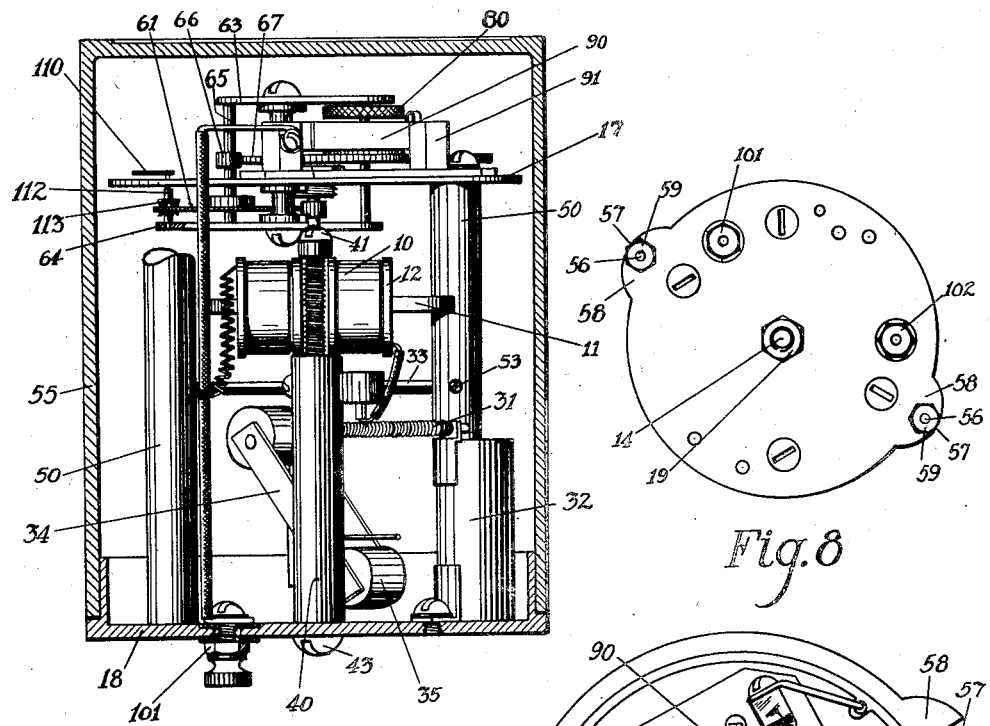
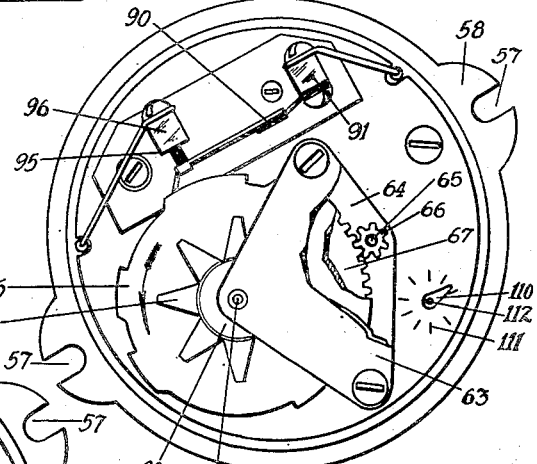
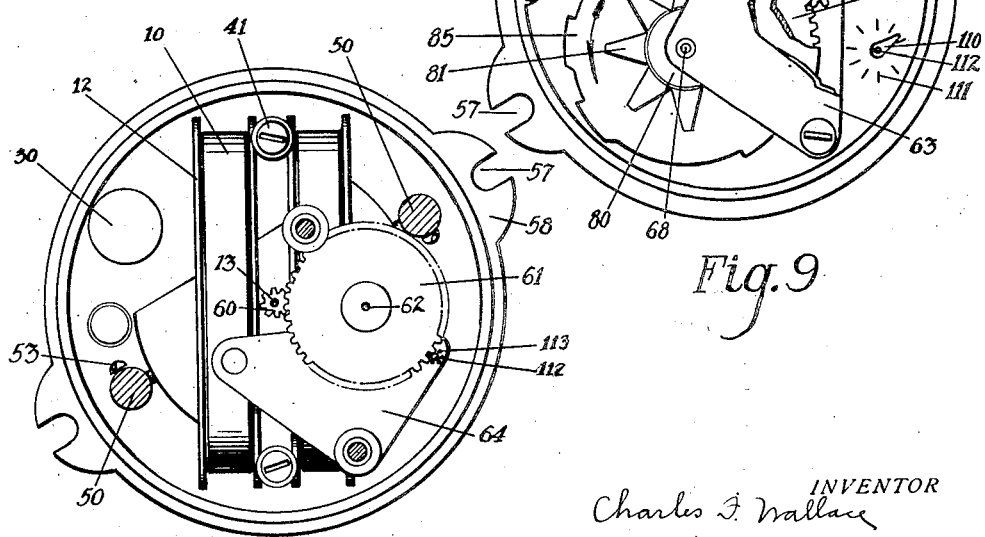
INVENTOR
Charles F. Wallace
BY Cooper, Kerr & Dunham
ATTORNEYS Patented Dec. 25, 1934

1,985,357

UNITED STATES PATENT OFFICE 1,985,357

ELECTRIC MOTOR APPARATUS

Charles F. Wallace, Westfield, N. J., assignor to Wallace & Tiernan Products, Inc., Belleville, N. J., a corporation of New Jersey Application March 1, 1932, Serial No. 596,072

14 Claims. (Cl. 171—222)

This invention relates to apparatus for translating electrical energy into mechanical movement and has for a general object to provide a novel combination of instrumentalities for that purpose.

Some of the various more specific objects of the invention are to provide an electric motor which is so efficient and economical with respect to magnetic motors as a class as to be continuously operable for an extended period of time from a source of electrical energy of comparatively low voltage and comparatively low power, such as a battery; which is self-starting; which will regulate its speed so as to maintain the speed substantially constant notwithstanding supply voltage variation over a comparatively wide range; which is comparatively simple in construction; which is so reliable in its operation as to require little or no attention; and which is so rugged that it will withstand comparatively hard usage without interference with its efficient and reliable operation. Other objects and advantages will appear as the invention is hereinafter disclosed.

Referring to the drawings, which illustrate what I now consider an advantageous physical embodiment of the invention:

Fig. 7 is a view similar to Fig. 1 but looking in the direction of the arrow 7 in Fig. 1.

Fig. 8 is an inverted plan view of the complete unit.

Fig. 9 is a section taken on the line 9—9 of Fig. 1.

Fig. 10 is a section taken on the line 410—410 of Fig. 1.

Figure 1:
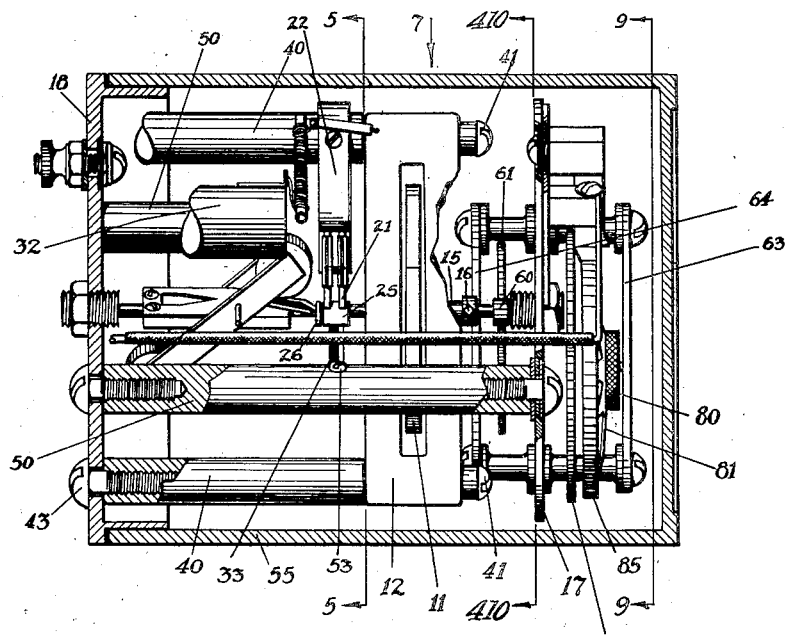
Fig. 1 is an elevation, with the casing in section and certain other parts broken away for clarity in illustration, of a "unit" embodying my invention.
Figure 2:
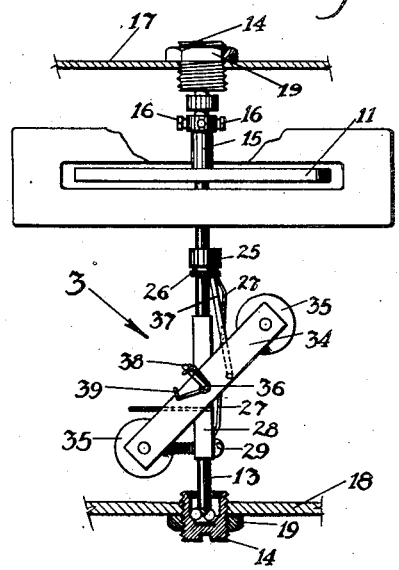
Fig. 2 is a fragmentary detail elevation showing some of the important features of construction of the motor.
Figure 3:
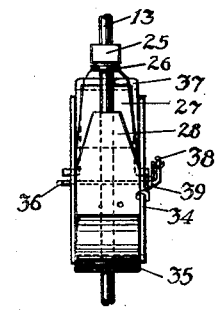
Fig. 3 is a detail view, looking in the direction of the arrow 3, of certain of the motor-controlling apparatus shown in Fig. 2.

With the understanding that the apparatus may assume other forms within the scope of claims appended hereto, I shall now proceed to describe the construction and operation of the apparatus illustrated.

The motor comprises (see particularly Figs. 1-5) a stationary electromagnetic field or stator and a rotor. The field comprises the two coils or electromagnets 10, 10 which are so electrically connected as to operate as one in the establishment of a field of magnetic flux; two coils or windings being provided for facilitating construction and assembly. Each electromagnet 10 comprises an elongated frame or spool 12 of appropriate insulating material, such as bakelite, upon which the coil of wire comprising the electromagnets is wound. The rotor 11 is permanently magnetized, or poled, is advantageously constructed of metal in the nature of cobalt steel, and is secured to a shaft 13 journaled at its extremities in thrust bearings 14, 14. The rotor 11 is secured to the shaft 13 by means of a collar 15 to which the rotor is secured; the collar 15 being provided with set screws 16 adapted to engage and disengage the shaft 13. By virtue of this construction the rotor 11 may be accurately set to its desired axial and angular position and held in the desired set position. The bearings 14 are each so constructed as to constitute a thrust bearing and they are appropriately axially adjustable. Thus, each bearing 14 comprises a plurality of balls, in the present case three, between which a conical end of the shaft 13 seats. Each bearing 14 is externally screw-threaded so as to be capable of being advanced into or withdrawn out of the corresponding stationary plate 17, 18, lock nuts 19 being provided to secure the bearings in the desired relative position of axial adjustment. By virtue of these various provisions the rotor 11 may be accurately positioned with respect to the field, both axially and angularly, and so as to rotate freely with comparatively little friction at the bearings, yet without undesired radial or end play of the rotor shaft.

Figure 4:
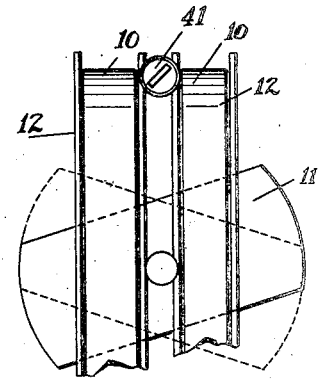
Fig. 4 is a fragmentary detail plan view of certain of the parts of the motor shown in Fig. 2.
Figure 5:
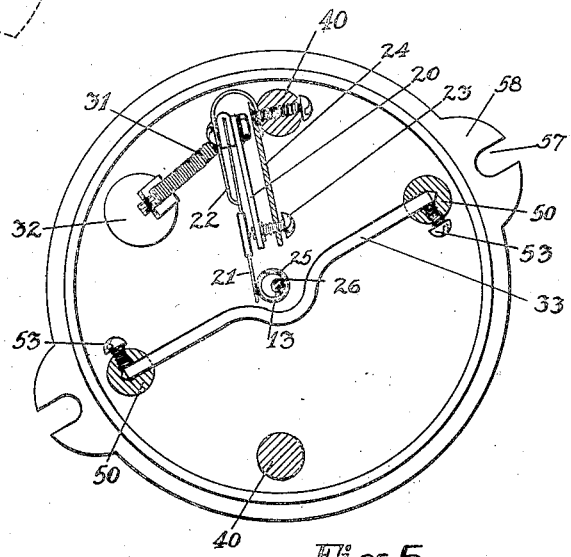
Fig. 5 is a section on the line 5—5 of Fig. 1.
Figure 6:
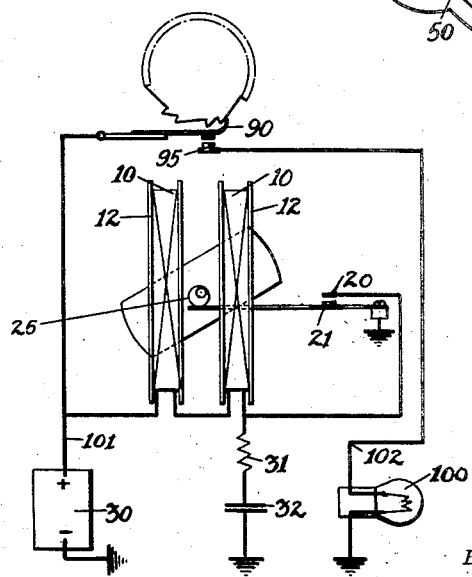
Fig. 6 is a wiring diagram showing one form of electrical connections.

The field coils 10, 10, are automatically intermittently energized so as to cause the rotor to rotate about its axis in a counterclockwise direction (see Fig. 4). This is accomplished by instrumentalities which I shall now proceed to describe. An electrical contact strip 20 (see Fig. 5) is secured to the frame of the machine, but insulated therefrom, and is adapted to be engaged by electrical contact strips 21 (see also Fig. 1) also secured to the frame and electrically connected thereto. The contact strips 21 are inherently resilient and by virtue of their inherent resiliency and the resiliency of a spring strip 22, are biased toward the contact strip 20 and normally make electrical contact therewith except when the contact strips 21 are mechanically moved away from the contact strip 20 in the manner presently to be described. The contact strip 20 is manually adjustable toward or away from the contact strips 21 by virtue of a set screw 23 screw-threadedly mounted in a strip 24 secured to the frame of the machine, the set screw 23 is appropriately insulated from the contact strip 20 so as not to short-circuit the contacts 20—21. The free ends of the contact strips 21 engage the periphery of an insulated sleeve or bushing 25, made of appropriate wear resisting insulating material, such as bakelite, mounted upon a metallic sleeve 26 which surrounds the shaft 13. The sleeve 26 is carried by a leaf spring 27 secured to a plate 28 by means of screws 29; the plate 28 being secured to the shaft 13 so as to rotate therewith. The construction and design are such that the spring plate 27 pushes the sleeve 26 toward the position in which it is coaxial with the shaft 13. When, however, the motor is at rest, i. e. its field coils are not energized, the sleeve 26 is forced by a bail 37 into an eccentric position with respect to the shaft 13 so that when the shaft 13 rotates the electrical contact between the contact elements 20—21 will be automatically made and broken. At this point it may be mentioned that in the arrangement illustrated, the sleeve 25 holds the contacts 21 out of engagement with the contact 20 whenever the sleeve 25 is concentric with the shaft 13 and also whenever the high part of the eccentric 25 is in engagement with the strips 21 (when the sleeve 25 is in an eccentric position with respect to the shaft 13); it is only when the sleeve 25 is in an eccentric position with respect to the shaft 13 and the low portion of the eccentric engages the contact strips 21, that electrical engagement of the contacts 20—21 takes place. The construction and design of the parts are such that the motor operates as follows, when electrically connected as shown diagrammatically in Fig. 6. Referring to Fig. 6 it will be seen that the battery 30 is connected in series with the two coils or windings 10, 10 and in series with the contacts 20, 21.

When the rotor 11 is in the full line position shown in Fig. 4 the coils 10, 10 are energized and establish an electromagnetic field which exerts a pull or torque upon the rotor 11 in a counter-clockwise direction. This pull or torque is continuously exerted by continued energization of the coils 10, 10, until the rotor has traveled through substantially 120° at which time the contacts 20—21 open and deenergize the coils 10, 10. In other words the contacts 20—21 automatically close, by virtue of the eccentricity of the insulated sleeve 25, when the rotor reaches the full line position shown in Fig. 4 and the circuit is automatically broken, by virtue of the eccentrically mounted insulated sleeve 25, at the contacts 20—21 when the rotor reaches the position substantially 120° from that full line position. The pull or torque so exercised upon the rotor during a portion of each revolution causes the rotor to revolve continuously.

It will be noted that the member 25 is not a commutator; it does not carry electric current at all but constitutes a cam or eccentric for operating the contact strips 21 as above described. By virtue of this construction and function the friction between the strips 21 and the member 25 is minimized.

A resistance 31 and a condenser 32, connected in series and shunted across the contacts 20—21 (see Fig. 6), are provided for preventing arcing across the contacts 20—21.

Means are provided whereby the motor is self-starting. For this purpose there is so mounted below the rotor 11, (see Fig. 5) a stationary permanent magnet 33, which is so poled as to cause the rotor 11 to assume a predetermined position when the motor is not operating. This predetermined position of the rotor 11 is one slightly counterclockwise of the full line position of the rotor as shown in Fig. 4, so that when the main motor circuit is closed to start the motor, the eccentric 25 will be in such position that the contacts 20—21 will be closed and the rotor 11 in the most advantageous position for the energized coils 10 to exert their maximum pull thereon and self-starting of the motor insured.

The following mechanism is provided for automatically controlling the speed of the motor. A governor comprising two side plates 34 having weights 35 secured between them adjacent their extremities straddles the plate 28 and is mounted for pivotal movement with respect to said plate by virtue of a spindle 36 secured to the plate 28 and projecting at its opposite ends therefrom and through the side plates 34. The governor is provided with a bail 37 pivoted at its opposite ends in relatively the same location in a corresponding one of each of the side plates 34, and which extends, at its remote intermediate portion, between the spring member 27 and the shaft 13. One end of the spindle 36 is bent to form an arm 38. A spring 39 coiled around the spindle 36 has one of its ends in operative engagement with one of the side plates 34 and its other end in operative engagement with the arm 38 so as to bias the governor about the axis of the spindle 36 in such direction as to cause the bail 37 to engage the plate 27 and move the metallic sleeve 26 and the insulated bushing 25 to its most eccentric position with respect to the shaft 13. When a predetermined speed of rotation, or angular velocity, of the shaft 13, and likewise the governor, is reached, the weights of the governor, being impelled by centrifugal force, cause the governor plates 34 to counteract the effect of the coil spring 39 and move in such direction about the axis of the spindle 36 as to withdraw the bail 37 and permit the spring 27 to move the member 25 from its eccentric to a concentric position with respect to the shaft 13. Recapitulating: When the shaft 13 is at rest the member 25 occupies its most eccentric position with respect to the shaft 13, and when the shaft 13 is rotating and at a sufficiently high enough speed, the governor causes the member 25 to assume its other limiting position, i. e. to take a position substantially concentric with the shaft 13; these being the two limiting positions of the insulated bushing 25 with respect to the shaft 13. When the member 25 is in its most eccentric position contact is established between the contacts 20—21 when the low part of the eccentric is under the contact strips 21. When the high spot of the eccentric is under the contact strips 21 and also when the member 25 is in its concentric position, the contact strips 21 are held out of engagement with the contact 20. The duration of engagement between the contacts 20—21 therefore depends upon the speed of rotation of the shaft 13, the duration of closure being longest when the member 25 is in its most eccentric position with respect to the shaft 13, diminishing in length of time or duration as the speed of the shaft 13 increases and finally, when a sufficient speed of rotation is reached, no contact at all is established at the contacts 20—21. By virtue of this governor control, the speed of rotation of the rotor 11 is maintained substantially constant. Any tendency for the speed to rise above the predetermined rate causes the duration of contact between the contacts 20—21 to be diminished or even reduced to zero whereupon the rotor automatically slows down. The predetermined constant speed desired may be varied by adjusting the arm 38 about the axis of the spindle 36 in one direction or the other to increase or decrease the tension of the spring 39. In the particular embodiment shown, when the arm 38 is adjusted in a clockwise direction (as viewed in Fig. 2) the motor will run at a slower speed, and, conversely, when the arm 38 is adjusted in a counterclockwise direction the motor will run faster. After the arm 38 has been adjusted to select the desired predetermined speed the motor will automatically run at that selected speed and there will be no substantial departure therefrom.

From the foregoing it will be understood that the governor controls the degree of eccentricity of the insulated bushing 25 which opens or closes the motor contacts 20—21. When operating, the governor swings out tending to position the bushing concentrically with the shaft 13 and opening the contacts 20—21. As the speed drops down, the governor weights swing in and place the bushing 25 in its eccentric position with respect to the shaft 13, permitting the contacts 20—21 to close once during each revolution thereby giving the armature a momentary impulse until the predetermined speed is attained. The torque exerted upon the rotor 11 depends upon the angular or segmental length, so to speak, of the time of closure of the contacts 20—21. It is by controlling this length of time that the automatic speed control is effected. The motor will maintain its predetermined speed automatically, once it has been adjusted, even though different loads may be placed upon the motor. If the load is comparatively light, the duration of contact at 20—21 during each revolution will be relatively short; if the load is comparatively heavy the duration of contact will be relatively long, but in any case the speed of the motor will be automatically maintained substantially constant.

I shall now proceed to describe certain structural features of the unit illustrated in the drawings which features are of importance from a mechanical and/or electrical view point. The field coils 10, 10 are mounted by having their spools 12 held in fixed relation to the upper ends of the two standards 40—40 by means of the screws 41 in threaded relation to the upper portion of the standards 40. The standards 40 are secured by means of screws 43 to the plate 18 (see Fig. 7). It will thus be seen that the spools 12 are securely gripped at their opposite ends and held firmly in position by an arrangement which permits ready assembly and dis-assembly. The contact or switch mechanism 20—21 is secured to and carried by one of the standards 40. The condenser 32 is appropriately secured in fixed relation to the plate 18 and the resistance 31 is flexibly secured at one end to the upper end and terminal of the condenser 32 and at its opposite end to the contact plate 20. The plate 17 is secured to the plate 18, in fixed spaced relation therefrom, by standards 50, 50, connected at their opposite ends by screws to the two plates 17, 18. The permanent magnet 33 extends at its opposite ends into the standards 50, 50, being secured thereto by means of set screws 53. Except where insulation is necessary or desired, as related above, or in the description which is to follow, substantially the entire structure of the unit illustrated is made of non-magnetizable metal with the exception of the shaft 13 and the rotor 11. The casing 55 is made of an impervious non-conducting material, such as bakelite, and is detachably secured to the plate 18 by means of rods 56 anchored thereon at one end and engageable with slots 57 provided in diametrically oppositely extending ears 58 of the base plate and securable therein by means of the nuts 59. By using magnetic metal, only where it is required, as in the rotor 11, the losses due to hysteresis are minimized and the efficiency of the motor increased. The plate 17 and the parts carried thereby and connected thereto are appropriately insulated from the remainder of the apparatus so as further to reduce the losses. If the plate 17 were not appropriately insulated it would have the effect of a one turn field and the motor would be less efficient. The plate 18 and the various standards connected thereto are used as a grounded side of the electrical circuit.

While my motor is adapted to be used in other combinations and for various other purposes, it is admirably adapted to operate a code wheel which in turn operates electrical contacts for flashing a light in a warning beacon as used in marine or highway work. The particular unit disclosed has been quite satisfactorily employed in that class of service and comprises the mechanism which I shall now proceed to describe.

The rotor shaft 13 has secured thereto a pinion 60 which meshes with a gear wheel 61 mounted on a shaft 62 journaled at its opposite ends in plates 63, 64 secured to and carried by the plate 17 in spaced relation with respect thereto. The shaft 65 has secured thereto also a pinion 66 which meshes with a gear 67 secured to a shaft 68 journaled at its opposite ends in the plates 63, 64. The gear 67 is provided with a hub upon which a nut 80 screws so as to support a spring spider 81 in a position resiliently to engage a code wheel 85 of material in the nature of fibre or the like and cause the code wheel frictionally to engage the upper face of the gear wheel 67. The code wheel engages and operates, according to a predetermined code, a resilient contact 90 mounted on a stud 91 secured to, but insulated from, the plate 17; the resilient contact, when engaged by the high spots of the code wheel, engaging a stationary contact 95 carried by a stud 96 secured to the plate 17, but insulated therefrom. The frictional contact between the code wheel or program disc 85 and the gear 67 is sufficient to cause the gear 67 to drive the program disc to operate the contacts 90—95 when the gear is rotating in the proper (i. e. counterclockwise) direction, but if and when the gear 67 is rotated in the wrong direction (i. e. clockwise), the program disc does not rotate, but slips, so that damage to the contact 90 is prevented.

The contacts 90—95 (see Fig. 6) are connected in series with the battery 30 and a lamp 100 so as to flash the latter according to the code dictated by the code wheel or program disc 85. It will be noted that one terminal (the negative) of the battery 30 is grounded, and the other terminal (the positive) of the battery 30 is connected to a binding post 101, to which the contact 90 and one terminal of the serially connected coils 10, 10, are connected. The contact 95 is connected to a binding post 102 to which one terminal of the lamp 100 is also connected; the other terminal of the lamp being grounded. The plate 18 and its standards 40, 40, and 50, 50 are, as stated, also grounded. The binding posts 101, 102 are insulated from the plate 18.

A timing indicator is provided as an aid in determining the length of time during which contact is made while employing any specific program disc. This indicator comprises a pointer 110, and a dial 111 provided on the plate 17. The pointer is carried by a shaft 112, journaled in the plates 17, 64, and driven by a pinion 113 secured to the shaft 112 and meshing with the gear 61 and driven thereby. It will be noted that the dial 111 is provided with ten uniformly spaced graduations. The construction and design are such that when the code wheel or program disc 85 is being driven, by the rotor 11, so as to rotate at 5 R. P. M., then one complete revolution of the pointer 110 will take place in one-tenth of a second and each of the ten graduations of the scale or dial 111 will represent one one-hundredth of a second. By counting the number of scale divisions swept over by the pointer 110 during the interval when the lamp circuit is closed (i. e. the lamp is lighted) the period of contact is obtained in hundredths of a second.

As stated, my invention, and particularly the physical embodiment illustrated, is adapted for operating flashing lights used as warning beacons for use in marine aeronautical and highway work. In the heretofore customary manner of operating such devices, marine lights used on buoys, river beacons, lighthouses, etc. where power current is not available, are actuated from gas supplied in cylinders, such as Pintsch gas or acetylene. These cylinders are heavy, difficult to handle, and represent a large investment as well as a large transportation expense in returning the empty cylinders and re-shipping them when filled; whereas where batteries are used, if dry cells are the source of power, these are thrown away when exhausted, and when wet cells are used, it is only necessary to recharge the cells, so making it very much easier to maintain the source of power.

The particular unit shown as developed can be made for any voltage which it is desirable to use with primary batteries, two typical cases being a fifteen volt mechanism which will operate on any voltage of from 8 to eighteen volts, and a six volt unit which will operate on any voltage of from say four to seven and one-half volts.

One set of dry cells, i. e., on a six volt mechanism, four standard #6 dry cells connected in series to give six volts, will operate the mechanism for a period of one year and give ample margin of safety inasmuch as the actual ampere hours consumed is less than one-half of that available from such a set of dry cells.

The motor will deliver ample power to flash any size of light used in marine work, provided contacts or relays adaptable for carrying the current required for the light are employed.

While the apparatus was developed primarily for flashing lights, its field of usefulness is very broad. It will run equally well in any position, will give satisfactory service even when subjected to the violent motion encountered on a buoy, and will operate without attention over long periods of time.

Some of the other uses to which the invention may be put are for controlling code signals for radio work as used in radio beacon sending stations in the United States Lighthouse Service for giving ships their location, and for controlling radio beacon signals as sent out by the Airways Division of the Lighthouse Service to give aeroplanes their position, and in fact, as a motovative agent for any purpose whatsoever within the limits of the mechanism.

The constancy of speed is independent of voltage variation within the limits as indicated above, the variation of speed from any desired predetermined constant speed being not more than about one per cent.

Another feature of my motor is that it consumes no more energy than is required to produce the desired amount of motion and does so by the use of only one make and break device in the circuit.

Still another advantage of my motor is that it will maintain time-keeping characteristics while transmitting power from the time-keeping element to operate other apparatus.

The apparatus is, of course, susceptible to modification without departing from the fundamental principles of the invention. Thus, if desired, in certain cases or conditions of use, the motor may be provided with another set of contacts similar to the contacts 20—21 to be so operated, by the same cam or sleeve 25 which operates the said contacts 20—21, as to cause the coils 10, 10 to be energized and exert a torque on the rotor 11 during its other half revolution or, more accurately, during a portion of the other half-revolution. In such case, the coils 10, 10 would be energized in one direction by one set of contacts (20—21) and in the opposite direction by the other set of contacts, separate batteries being employed to effect the proper poling. Such an arrangement would double the power of the motor. However, I have found the form of device illustrated very satisfactory for a variety of purposes.

The particular unit herein illustrated has proved satisfactory in service. While, as stated, the invention may be embodied in other forms of apparatus having other dimensions, the particular unit illustrated is comparatively small, the diameter of the casing cover 55 being about 3½ inches and its height about 4½ inches. The condenser 32 has a rated capacity of 0.1 microfarads and the resistance 31 has a resistance of 100 ohms. Each of the coils 10 is made of No. 36 copper wire having 2000 turns. The particular unit illustrated will operate on a D. C. voltage of 7.5, which voltage may be conveniently supplied by five (5) ordinary dry cells (known in the trade as #6) connected in series; these five cells having sufficient energy to operate a unit continuously for a year with a considerable factor of safety or reserve power.

In accordance with the provisions of the patent statutes, I have herein described the principle of operation of my invention, together with the apparatus which I now consider to represent the most advantageous embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

What I claim is:

1. An electric motor comprising in combination, a stator, an unwound rotor, means comprising a circuit controller which must be intermittently opened and closed to produce any electromagnetic rotation of the rotor, and an eccentric for operating a circuit controller for energizing the motor to produce rotation of the rotor, and a governor operated by the rotor for varying the degree of eccentricity of the eccentric to control the speed of the rotor.

2. An electric motor comprising in combination, a permanently magnetized rotor, a field winding for exerting an electromagnetic torque upon said rotor, means comprising a circuit controller and an eccentric for operating the circuit controller for energizing the field winding to produce rotation of the rotor, and a governor operated by the rotor for varying the degree of eccentricity of the eccentric to control the speed of the rotor.

3. An electric motor comprising in combination, a stator, an unwound rotor, means comprising a circuit controller operated by the rotor and which must be intermittently opened and closed to produce any electromagnetic rotation of the rotor, for energizing the motor to produce rotation of the rotor, and a governor operated by the rotor controlling the operation of the circuit controller by the rotor and the duration of contact of said controller per revolution of the rotor to govern the speed of the rotor.

4. An electric motor comprising in combination, a permanently magnetized rotor, a field winding for exerting an electromagnetic torque upon said rotor, means comprising a circuit controller operated by the rotor for energizing the motor to produce rotation of the rotor, and a governor operated by the rotor controlling the operation of the circuit controller by the rotor and the duration of contact of said controller per revolution of the rotor to govern the speed of the rotor.

5. An electric motor comprising in combination, a field winding comprising a solenoid, a permanently magnetized rotor mounted for rotation within said solenoid about an axis at an angle to the axis of the solenoid, and means controlled by rotation of said rotor for energizing and deenergizing said field winding to produce a torque upon and rotate said rotor.

6. An electric motor comprising in combination, a solenoid, a permanently magnetized rotor mounted for rotation within said solenoid about an axis at an angle to the axis of the solenoid, and means including a switching device rotated by said rotor for energizing and deenergizing said solenoid to produce rotation of said rotor.

7. An electric motor comprising in combination, a solenoid, a rotatable armature within said solenoid, a switch for making and breaking the circuit of said solenoid, means carried by the armature shaft for periodically operating the switch, and a governor carried by the armature shaft for governing the operation of the switch by the said means.

8. In combination, a motor of the magnetic type comprising a switch operated by the motor for controlling its periodic energization, means including a governor operated by the motor for maintaining its speed substantially uniform, adjustable means for determining the speed at which the motor will be maintained, a circuit-controlling switch operated by the motor, and indicating means operated by the motor for timing the closure of the last mentioned switch.

9. An electric motor comprising in combination, an air-core solenoid constituting a field winding, a permanently magnetized rotor mounted for rotation within said solenoid, and means controlled by rotation of said rotor for energizing and deenergizing said field winding to produce a torque upon and rotate said rotor.

10. An electric motor comprising in combination, an air-core solenoid, a permanently magnetized rotor mounted for rotation within said solenoid, and means including a switching device rotated by said rotor for energizing and deenergizing said solenoid to produce rotation of said rotor.

11. An electric motor comprising in combination, a field winding comprising a solenoid having a flat elongated core opening, a permanently magnetized rotor mounted for rotation within said core opening of said solenoid, and means controlled by rotation of said rotor for energizing and deenergizing said field winding to produce a torque upon and rotate said rotor.

12. An electric motor comprising in combination, a solenoid, a rotatable armature within said solenoid, a stationary switch having relatively movable contacts for making and breaking the circuit of said solenoid, means carried by the armature shaft for periodically operating the switch, and a governor carried by the armature shaft for governing the time length of operation of said switch per revolution of said means.

13. An electric motor comprising in combination, an air-core solenoid constituting a field winding, a permanently magnetized rotor mounted for rotation within said solenoid, and means controlled by rotation of said rotor for energizing and deenergizing said field winding to produce a torque upon and rotate said rotor, the last mentioned means including a device for continuously energizing said field winding throughout more than 90 electrical degrees of rotation of said rotor.

14. An electric motor comprising in combination, an air-core solenoid constituting a field winding, a permanently magnetized rotor mounted for rotation within said solenoid, means controlled by rotation of said rotor for energizing and deenergizing said field winding to produce a torque upon and rotate said rotor, the last mentioned means including a device for continuously energizing said field winding throughout more than 90 electrical degrees of rotation of said rotor, and speed-responsive means for automatically controlling the duration of such energization of said field winding per revolution of the rotor.

CHARLES F. WALLACE.